June 11, 1968 EISHUN KIMURA 3,388,013

METHOD OF FORMING A P-N JUNCTION IN A POLYCRYSTALINE MATERIAL

Original Filed Sept. 18, 1964 4 Sheets-Sheet 1

3,388,013
METHOD OF FORMING A P-N JUNCTION IN A POLYCRYSTALLINE MATERIAL

Eishun Kimura, Kyoto, Japan, assignor to Matsushita Electronics Corporation, Osaka, Japan, a corporation of Japan Original application Sept. 18, 1964, Ser. No. 397,486, now Patent No. 3,332,810, dated, July 25, 1967. Divided and this application Apr. 24, 1967, Ser. No. 633,076
Claims priority, application Japan, Sept. 28, 1963, 38/52,841
7 Claims. (Cl. 148—186)

ABSTRACT OF THE DISCLOSURE

A semiconductor device formed from a slice from an aligned polycrystalline rod cut in a direction which is substantially perpendicular to the direction of crystal growth and diffusing at least one impurity, having a conductivity type opposite to that of the rod material, on at least one surface of the slice to form a p-n junction.

This is a division of my application Ser. No. 397,486 filed Sept. 18, 1964, now Patent 3,332,810.

This invention relates to silicon rectifier devices of a novel type.

The present invention has for its object to provide a polycrystalline silicon rectifier device.

Another object of the present invention is to provide a polycrystalline silicon rectifier device having a large current capacity.

A further object of the invention is to provide a polycrystalline silicon rectifier device which is reduced in cost.

Yet another object of the present invention is to extend the application range of polycrystalline silicon rectifier devices and particularly to provide a direct-current power supply source for automotive use including an alternating-current generator and a plurality of such polycrystalline silicon rectifier devices, which is to be commercially useable with economical advantages over conventional direct-current generators with commutator brushes.

One of the important features of the present invention is to provide a technique of making diffused type p-n junction diodes from a silicon material consisting of a multiplicity of "aligned" polycrystals which is controllable in practice and works appropriately under production conditions.

The term "aligned" as used in the specification and in the annexed claims means that the polycrystalline silicon material employed in the present invention, unlike conventional polycrystalline materials, includes an assemblage of crystals aligned in one specific direction by a special technical procedure, as will be described hereinafter in detail, and this alignment of polycrystals in a specific direction forms an important feature of the present invention.

As is well known, conventional silicon rectifier devices have employed a base formed of a single crystal of silicon and impurities which exhibit a conductivity type opposite to that of the base have been added to the base by the alloying or diffusion method to form a p-n junction therein. With such a monocrystalline silicon rectifier element, it is a necessary condition for an increase in the current capacity to increase the area of the monocrystalline base plate since the current capacity of a rectifier element varies in proportion to its area.

On the other hand, single crystals of silicon are formed from polycrystalline silicon material to which a single crystal seed is applied and then passed through a complicated crystal-growing process which may include a repetition of a floating operation. Technical difficulties involved in the said process form a limitation to the cross section of the single crystal and hence to the current capacity of the rectifier element formed of such single crystal.

In cases where a multiplicity of such monocrystalline silicon rectifier elements are combined in an electrically parallel connection to obtain an increased overall current capacity, not only increased maintenance is required but also the surface leakage currents occurring on the end faces of the respective rectifier elements are added up to cause deterioration in the overall electrical characteristics of the rectifier system and particularly to result in the reduced service life due to an increased susceptibility to adverse effects of the surface-coated substance and the ambient gases.

In the manufacture of aligned polycrystalline silicon material, however, there seems to be no technical limitation to the size of its cross section and hence to the current capacity of one rectifier element. In other words, the polycrystalline element obtainable according to the present invention in effect corresponds to a multiplicity of single-crystal elements joined together to each other in such a way so as to not expose joined end faces of single-crystal elements to an adverse ambient atmosphere. The leakage current occurring on the joined end faces of such respective single-crystal elements is apparently reduced to a remarkable extent and the surface area of the exposed end face of the polycrystalline element, an important factor liable for deterioration, can be diminished.

The foregoing and other objects, features and advantages of the present invention will become apparent from the following description when taken in conjunction with the accompanying drawings, in which:

FIG. 1 diagrammatically illustrates an electrically parallel connection of conventional monocrystalline rectifier elements;

FIG. 2 diagrammatically illustrates the aligned polycrystalline rectifier element according to the present invention;

FIGS. 3*a*, 3*b*, 3*c*, 3*d* and 3*e* schematically illustrate the successive stages of the process of one experiment in making a polycrystalline rectifier from an n-type polycrystalline silicon rod including nonaligned polycrystals;

FIG. 4 is a schematic representation of the microstructure of the rectifier in cross section through the p-n junction formed therein;

FIG. 5 schematically illustrates the process of forming an aligned polycrystalline silicon rod, which includes crystals grown substantially in one specific direction;

Figures 6, 7, 8, 9, 10, 11, 12, 13:
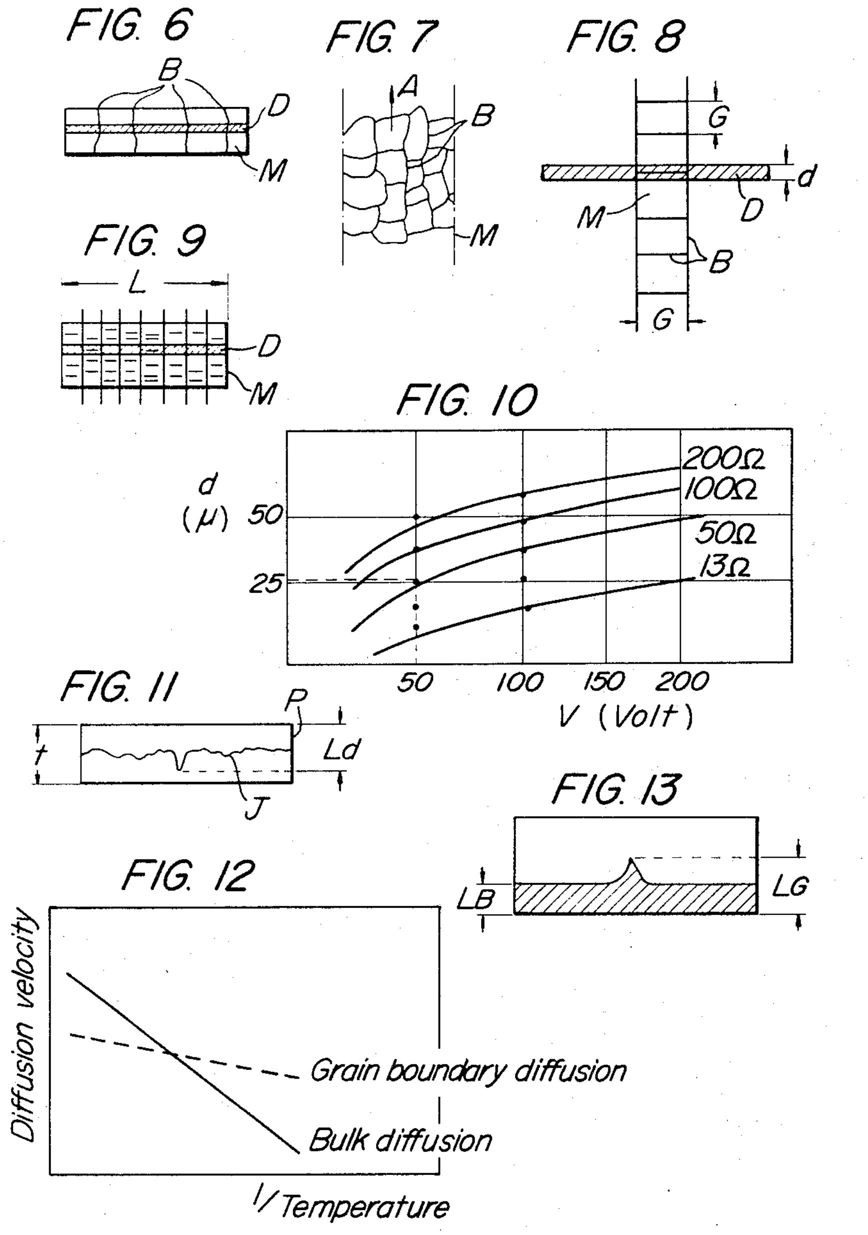
FIG. 6 is a cross-sectional view of an aligned polycrystalline rectifier element taken through the p-n junction formed therein.
FIG. 7 is a schematic cross section of a polycrystalline rod in which the grain boundaries have extended not only in the specific direction of crystal growth but also transversely thereof.

FIG. 8 schematically illustrates the grain arrangement in the polycrystalline rectifier element relative to the p-n junction formed therein;

FIG. 9 is a schematic cross section of the polycrystalline rectifier showing the arrangement of grain boundaries relative to the p-n junction.

Figure 14:
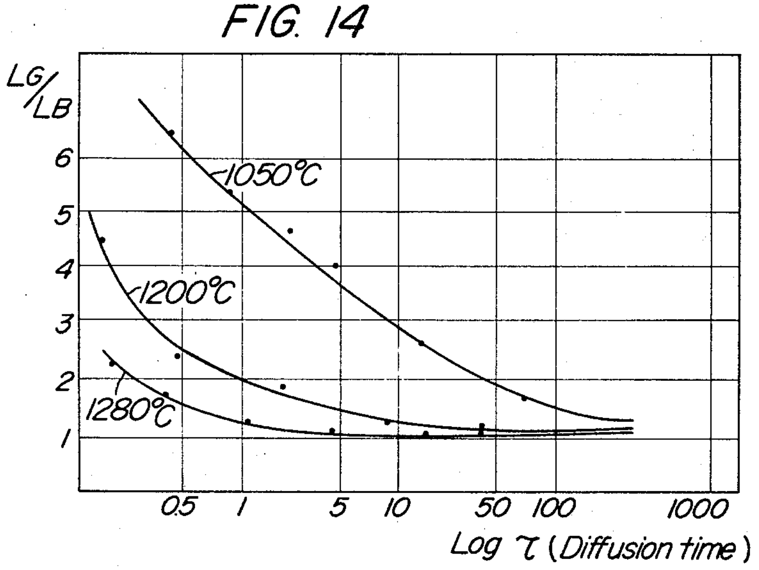
Figures 17, 18:
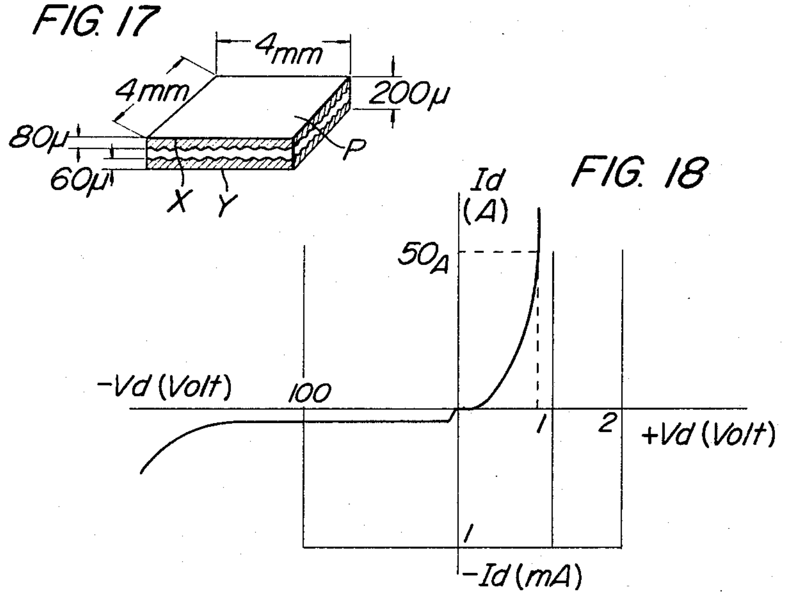
Figure 15:
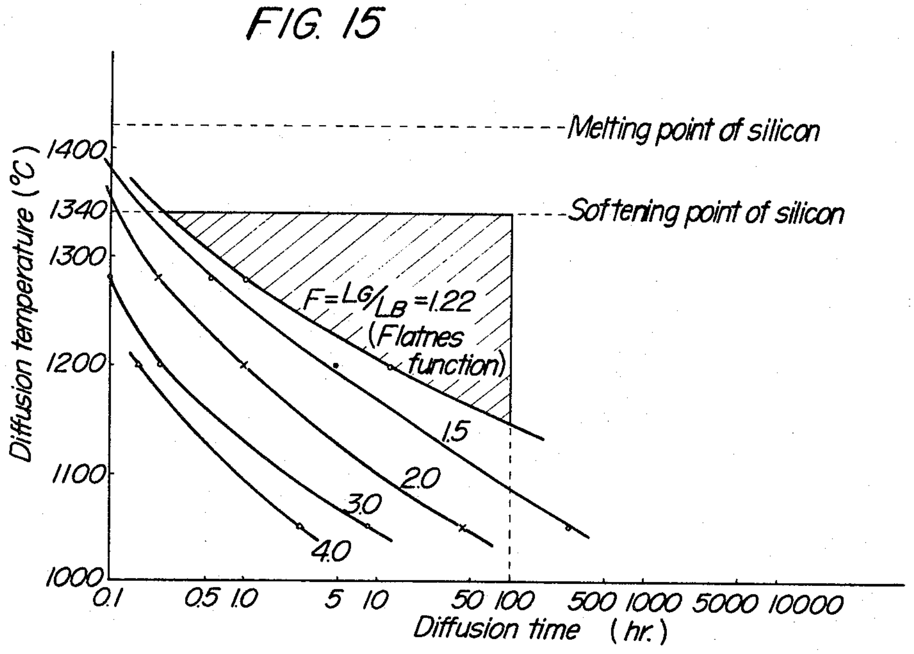
Figure 16:
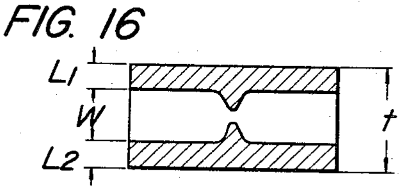
Figure 19:
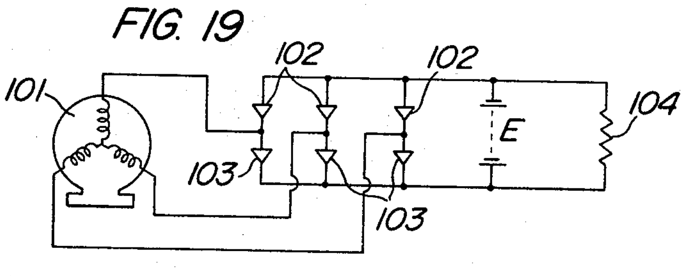

FIG. 10 illustrates the relationship between the thickness of depletion layer at the p-n junction and the applied voltage for different specific resistances;

FIG. 11 illustrates one example of the p-n junction formed in the polycrystalline rectifier element by solid diffusion;

FIG. 12 illustrates the relationship between the diffusion velocity and the reciprocal temperature for the grain boundary diffusion and for the bulk diffusion;

FIG. 13 is a cross section of the polycrystalline element schematically showing the formation of a p-n junction therein by diffusion of impurities of the conductivity type opposite to that of the polycrystalline material;

FIG. 14 is a graphical illustration of the relationship between the flatness function and the diffusion time at different diffusion temperatures;

FIG. 15 is a chart illustrating the relationship between the diffusion temperature and the diffusion time at different values of the flatness function for boron and phosphorus;

FIG. 16 is a schematic cross section of a silicon rectifier including boron and phosphorus diffused in the opposite sides of the n-type silicon base having a specific resistance of 50 Ω cm.;

FIG. 17 illustrates one example of polycrystalline silicon rectifier element according to the present invention;

FIG. 18 illustrates the electrical characteristics of the rectifier element shown in FIG. 17; and FIG. 19 is a circuit diagram of one example of the automotive electric power supply system having incorporated therein a number of rectifier elements according to the present invention.

Figure 1:
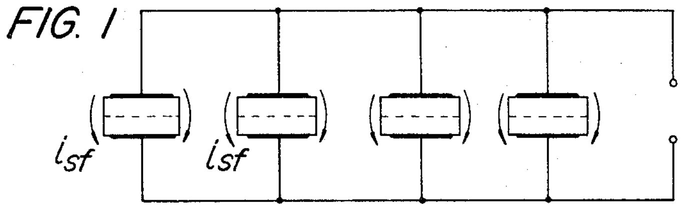
Figure 2:
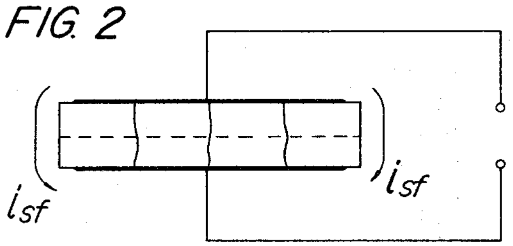

First, reduction in surface area and leakage current of the polycrystalline rectifier device according to the present invention as compared to conventional monocrystalline rectifiers will be apparent from comparison between FIGS. 1 and 2. In FIG. 1, which illustrates use of a multiplicity of conventional monocrystalline elements in an electrically parallel connection, the arrows indicate the surface leakage current $i_{sf}$ occuring on each of the elements. On the other hand, in the case of the aligned polycrystalline element of the invention, as shown in FIG. 2, leakage current $i_{sf}$ occurs only on the side surface of the entire rectifier device. In these figures, the broken line indicates the p-n junction formed in the silicon base.

As will be described hereinafter in more detail, a rectifier element can be made of aligned polycrystalline material which is favorably comparable in reverse breakdown voltage and other characteristics to a monocrystalline rectifier element even though the polycrystalline rectifier includes monocrystalline elements considerably limited in cross-sectional area as long as the size of the whole polycrystalline rectifier is appropriate. This facilitates production of the silicon material and serves to reduce the cost of manufacture of silicon rectifier elements.

It is, of course, undesirable for silicon rectifier elements to be high in cost. Particularly, in the direct-current power supply system for automotive use, a direct-current generator has been employed predominantly despite the fact that an alternating-current generator is generally superior to a direct-current generator in mechanical properties. One reason for this is that practical use of an alternating-current generator in the electric power system for automotive use has been commercially unfeasible unless the total price of the alternating-current generator and a rectifier device used in combination therewith could be reduced to a value substantially equal to or lower than that of the direct-current generator.

In addition, rectifier devices for automotive use are often required to operate satisfactorily at an ambient temperature considerably higher than the atmospheric temperature, for example, at 105° C. Because of this, it is a technical necessity to form rectifier elements for automotive use primarily of silicon. The present invention provides a silicon rectifier device which can be made at reduced cost and thus enables use of an alternating-current generator in the direct-current power supply system for automotive uses on a commercial basis.

Previously, there have been known a number of methods of manufacturing polycrystalline rectifiers. None of these methods, however, has been satisfactory for applications with which the present invention is concerned.

Also, cuprous oxide rectifiers known as metal rectifiers and selenium rectifiers are impertinent to the present invention, which relates to silicon diodes having a diffused type p-n junction formed therein.

Further, polycrystalline silicon rectifiers of the type which have previously been known as crystal detectors were formed of a polycrystalline material not fully refined and containing a high concentration of impurities and often had an extremely low reverse breakdown voltage. And it has been found to be very difficult to control their characteristics in their manufacture.

In contrast, the polycrystalline rectifier of the present invention is fully comparable to a monocrystalline rectifier in that its rectifying characteristics can be accurately controlled in its manufacture.

Rectifiers which employ a polycrystalline silicon layer vacuum-deposited on a metal base are disclosed, for example, in Japanese patent publication No. 3526/61 and the corresponding U.S. Patent No. 3,013,192.

Also, it is known that a polycrystalline silicon layer obtainable by reduction or thermal decomposition of a silicon-containing compound such as silicon tetrachloride, trichlorosilane, silane or silicon iodide exhibits rectfying characteristics. As is well known, however, polycrystalline silicon formed by vacuum deposition or by deposition from a gaseous phase usually takes the form of a complex aggregate of very minute crystal grains. Such silicon material is obviously different in structure from the polycrystalline material usable in the present invention, which is comprised of a multiplicity of aligned crystal grains grown or solidified from liquid phase silicon, i.e., molten silicon, and in which a p-n junction is formed by diffusion of appropriate impurities in a controllable manner.

The major difference between a single crystal and a polycrystalline substance lies in that the latter is comprised of single crystals put together and has, inbetween said single crystals, so-called intercrystalline or grain boundaries.

Having intensely investigated the effects of the grain boundaries upon the rectifying characteristics and upon diffusion of impurities, the inventor has reached the idea of an aligned polycrystalline material advantageously utilizable in manufacturing rectifier elements in a controllable manner under industrially feasible conditions.

One of the major differences in electrical characteristics between a single crystal of silicon and polycrystalline silicon is that the life time of minority carriers in the polycrystalline silicon is ordinarily found to be about one-tenth or less of that in the single crystal.

In transistors, the life time affects the proportion of the minority carriers reaching the collector to those emitted and thus constitutes one of the factors determining the current amplification of the transistor, whereas the voltage-current characteristic of a rectifier within its reverse breakdown voltage is expressed as follows:

(1)
$$i=I_s\left(e\times p\frac{eV}{kT}-1\right)$$

where V represents the applied voltage, $k$ represents the Boltzmann constant, and T represents the absolute temperature. Also (2)
$$I_s=A\cdot e\left(P_n\sqrt{\frac{D_p}{\tau_p}}+N_p\sqrt{\frac{D_n}{\tau_n}}\right)$$

where $P_n$ represents the hole density in the n-type region, $D_p$ the hole diffusion constant, $\tau_p$ the life time of holes, $N_p$ the electron density in the p-type region, $D_n$ the electron diffusion constant, and $\tau_n$ the life time of electrons.

As will be observed from these theoretical formulae, the current value of a rectifier element formed of a material containing minority carriers limited in life time, for example, polycrystalline silicon is $\sqrt{K}$ times as high for the same applied voltage, K representing the reduction coefficient of the life time.

This fact gives rise to an increase in reverse current and supposedly this has been the reason why in the past not a polycrystalline but a monocrystalline material has been used for rectifier elements.

However, it has been found that the above deficiencies inherent to conventional polycrystalline silicon material can be practically completely avoided by use of aligned polycrystalline silicon, as will be described hereinafter. Next, the principles of the present invention will be explained first by describing the course taken by the inventor to reach the above finding.

Figure 3:
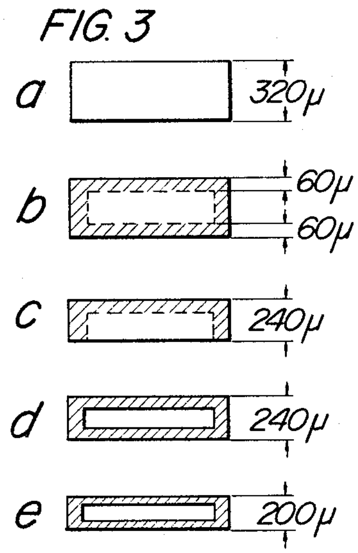

A slice 320 microns thick was cut from a certain kind of n-type polycrystalline silicon rod (FIG. 3*a*) and phosphorus was diffused in the slice to a depth of 60 microns from vapor of $P_2O_5$ (FIG. 3*b*). Subsequently, one face of the slice was removed to a depth of 80 microns (FIG. 3*c*). The surface thus exposed was coated with boric anhydride ($B_2O_3$) for diffusion of boron therein to a depth of 60 microns (FIG. 3*d*). The slice was then lapped to remove a surface layer of 20 microns thickness on both faces, giving a final slice thickness of 200 microns (FIG. 3*e*).

The slice was then nickel-plated and an element sized 4 x 4 mm. was cut to form a rectifier element.

This rectifier element exhibited a moderately good rectifying characteristic despite the fact that it was a polycrystalline rectifier.

Compared with rectifer elements formed of n-type monocrystalline silicon under the same manufacturing conditions and having the same dimensions, the polycrystalline element exhibited the following differences in electrical characteristics.

First, the polycrystalline silicon rectifier element obtained in this experiment with a p–n junction formed therein by solid diffusion exhibited for the same applied voltage a slightly higher value of reverse current, compared with that of a monocrystalline silicon rectifier element of the same dimensions which was obtained under the same manufacturing conditions. Also, the polycrystalline element had a reverse voltage-current characteristic slightly inclined in the vicinity of the breakdown voltage, thus exhibiting a so-called "softening," and a forward current characteristic including a satisfactory initial current rise but somewhat inferior in the higher current range. These experimental results can be theoretically understood from the effects upon the diode characteristics of the limited life time of the minority carriers in the polycrystalline rectifier material.

Further, microscopic observation of the structure of the polycrystalline rectifier particularly in the vicinity of the p–n junction therein has revealed the following fact.

Figure 4:
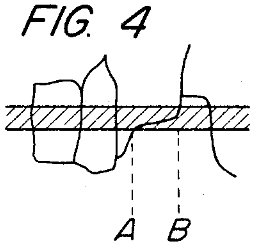

Referring to FIG. 4, the hatched area represents the depletion layer at the p–n junction and the solid lines represent intercrystalline or grain boundaries in the polycrystalline wafer.

Particular attention is directed to the section AB in FIG. 4, where a portion of grain boundary is observed extending through the depletion layer substantially parallel to its plane. It has been found that recombination of minority carriers in the depletion layer at the p–n junction occurring mainly due to the presence of grain boundaries in such section causes deterioration of the rectifier characteristics.

Contrariwise, from investigations conducted on the other rectifier sections where grain boundaries extend substantially perpendicular to the plane of the p–n junction, it has been found that these sections do not exhibit any significant difference from monocrystalline rectifiers in rectifying characteristics.

After all, it has been found that polycrystalline rectifier elements can have satisfactory characteristics as long as grain boundaries therein extend substantially perpendicular to the plane of the p–n junction. Thus, the inventor has reached a new conception that satisfactory rectifier elements can be obtained from a polycrystalline material as long as the individual crystals therein are aligned in a direction substantially perpendicular to the plane of the p–n junction formed in the material.

It is well known that, when silicon material is partly held in a molten state and cooled with an appropriate temperature gradient, the solid phase of silicon grows in the direction of temperature gradient. It will be noted therefore, that, by displacing the molten region in the direction of temperature gradient, an aligned polycrystalline silicon is obtainable which is comprised of elongate crystals extending in that direction. In other words, in the process of growing a polycrystalline silicon rod the grain boundaries therein can be aligned to extend in the longitudinal direction of the polycrystalline rod by pulling up the material from its liquid phase so as to cause its progressive solidification, as shown schematically in FIG. 5.

Figure 5:
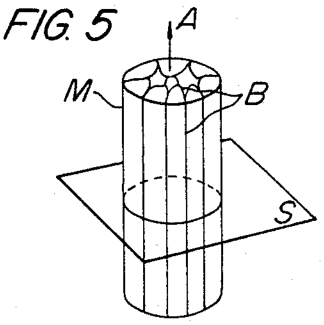

In FIG. 5, illustrating the polycrystalline silicon rod M, the arrow A indicates the direction in which the material is pulled up for progressive solidification, character B indicates intercrystalline or grain boundaries and character S indicates the plane in parallel with which the rod is to be sliced. This process is substantially based on the same principles as previously known floating and pullup methods and is technologically much more simple and convenient in that it is not necessary to obtain a single crystal over the entire cross section.

From the polycrystalline rod obtained in this manner, a slice is cut along a plane perpendicular to the direction of growing indicated by the arrow A (i.e., parallel with the plane S in FIG. 5) and impurties of the conductivity type opposite to that of the polycrystalline material are added by solid diffusion into the slice surface to form a p-n junction. The restifier element thus obtained has grain boundaries B kept from extending through the depletion layer D of the p-n junction in parallel thereto, as shown in FIG. 6, and exhibits electrical characteristics substantially equivalent to those of a monocrystalline rectifier element.

It has also been found that, even in cases where the above conditions are not fully met, a polycrystalline rectifier element can be obtained having substantially the same electrical characteristics as those of a monocrystalline rectifier element as long as the following additional conditions are met.

FIG. 7 illustrates a mode of polycrystalline growth in which grain boundaries B are not extended solely in the direction of growth A over the entire length of the rod but midway of its length they are also formed transversely thereof. In forming rectifier elements of such polycrystalline material, the size of crystal grains has an important significance.

FIG. 8 illustrates this situation in its most simplified form, in which it is assumed for ease of calculation that the crystal grains have identical horizontal and vertical dimensions G.

In FIG. 8, the hatched area D represents the depletion layer at the p-n junction, which has a thickness *d*. The probability *p* with which grain boundaries B extend in the region of depletion layer at the p-n junction in parallel thereto is expressed by the following formula:

$$p=\frac{d}{G} \quad (3)$$

where G represents the length of the sides of each crystal grain.

Referring next to FIG. 9, character L indicates the total length of the p-n junction of the rectifier element and the probability P with which at least one grain boundary extends through, and in parallel with, the depletion layer at the p-n junction in some region or other of the element is expressed as follows:

(4) $$P=1-(1-d/G)^n$$

where $$n=\frac{L}{G}$$

On the other hand, the thickness $d$ of the depletion layer of the p-n junction can be expressed by approximation of the abrupt junction as follows.

(5) $$d=\sqrt{\frac{\epsilon\mu_n}{2\pi}}\cdot\sqrt{\rho\left(V-\frac{kT}{e}l_n n_n/n_p\right)}\doteq\sqrt{\frac{\epsilon\mu_n}{2\pi}}\cdot\sqrt{\rho_V}$$

where $\epsilon$ represents the dielectric constant, $12\times10^{-12}$ F/cm. for silicon, $\mu_n$ the mobility of electrons, 1350 cm.$^2$/volt·sec., $\rho$ the specific resistance in Ω cm., V the applied voltage in volts, $n_n$ the electron concentration in the n-type region, and $n_p$ the electron concentration in the p-type region.

In one example of rectifier element having a specific resistance of 50 Ω cm. and a reverse applied voltage of 50 volts, a depletion layer is obtained which has a thickness of 25.4$\mu$, as calculated from Formula 5.

The relationship between the applied voltage and the depletion layer is graphically illustrated in FIG. 10 for different specific resistances.

If the probability P with which a grain boundary extends through and in parallel with the depletion layer at the p-n junction is less than 0.1 or if (6) $$P<0.1$$

it has been found that rectifiers can be manufactured from such polycrystalline silicon on a mass production basis by the diffusion method with substantially the same yield and product quality as in the production of monocrystalline rectifiers. And, from the above relationships, it is possible to determine the required minimum size of crystal grains.

With the above example of a polycrystalline rectifier, having a specific resistance of 50 Ω cm. and a reverse applied voltage of 50 volts, the required minimum size of crystal grains is found to be (7) $$G=\frac{d}{0.1}=254\mu$$

since the thickness $d$ of the depletion layer is 25.4 microns in this case.

In other words, it is noted that the Relationship 6 can be satisfied if the rectifier material has a minimum grain size of Formula 7, since the value of $n$ in Formula 4 is practically not as large a value for the actual rectifier dimension L as is necessary for the range of current capacity required for applications with which the present invention is concerned.

With due regard to the possible chances, in the process of aligned polycrystalline growth, of accidentally obtaining crystal grains considerably smaller in size among aligned crystals of desired size, it will be recognized from the relationship shown in FIG. 10 that use of polycrystalline silicon is particularly recommendable for rectifiers having higher current outputs and lower reverse voltages.

For such high output, low reverse voltage rectifiers, silicon material is preferred which has a limited specific resistance. Under this condition, the depletion layer at the p-n junction has a reduced thickness. The thickness $d$ of the depletion layer is also reduced owing to the low reverse applied voltage. Under these circumstances, it will be apparent that the probability with which a grain boundary extends through and substantially in parallel with the depletion layer at the p-n junction can be satisfactorily reduced.

On the other hand, to obtain a higher reverse breakdown voltage materials having a higher specific resistance are needed, which naturally give an increased thickness of the depletion layer in cooperation with the higher reverse applied voltage. Under this condition, if it is desired to reduce the probability with which a grain boundary extends through, and substantially in parallel with, the depletion layer at the p-n junction, the size of crystal grains in the polycrystalline material must be increased correspondingly, finally resulting in a monocrystalline structure.

Formation of a rod of a single crystal, however, is not always a necessary condition to obtain a high reverse breakdown voltage since even a polycrystalline rod can fully serve the purpose provided the crystal grains therein have a size not smaller than a specific value, as apparent from the above experiments and discussions related thereto.

Particularly, as far as low-voltage high-current rectifiers are concerned, the rectifier material is only required to have a minimum grain size expressed in Formula 7, and there is no need of employing expensive monocrystalline materials.

For example, for rectifiers for automotive battery charging, a minimum reverse breakdown voltage of 50 volts is specified in practice since in most cases the nominal battery voltage for smaller vehicles is 12 volts and that for larger vehicles 24 volts. For such rectifiers, the inventor proposes use of polycrystalline silicon prepared under the above-described manufacturing conditions and highly advantageous from the economic viewpoint because of its reduced cost.

In this connection, the polycrystalline rectifier base is only required to have an impurity content of one part per million or less, in order to obtain a specific resistance of not less than a number of fraction of one ohm, which gives a reverse breakdown voltage satisfactory for such applications.

In summarizing the foregoing, though as described hereinbefore, it is known that the lifetime of the minority carriers in polycrystalline material is smaller than that in single crystals, it has been found necessary to further elucidate the lifetime of the minority carriers for clear understanding of the operating mechanism of polycrystalline rectifier elements as proposed by the present invention. The lifetime of polycrystalline material can be determined by known methods, for example, by means of measuring the rate of decay of photoconductivity after irradiation with pulsed light, and it has been found that the value of lifetime determined by such method is a value statistically averaged over a relatively large region which contains a large number of minute single crystals.

However, it has been revealed that, in general, in a p-n junction rectifier element, with which this invention is concerned, the lifetime of the minority carriers which determines the reverse current of the rectifier, which is one of the important characteristic values in practice, is actually the one in the region of the depletion layer formed in the vicinity of the p-n junction in association with the reverse voltage applied and is not an averaged lifetime for a larger area outside of the region of the depletion layer at the p-n junction.

With regard to each of the individual crystal grains in the polycrystalline material, it is in fact a single crystal defined or surrounded by the adjoining grain boundaries, and therefore, there is no reason why the lifetime of the minority carriers inside such a small single crystal should differ from that of a single crystal larger in size.

Another important consideration in the manufacture of polycrystalline rectifiers according to the present invention is the procedure of adding to the polycrystalline silicon impurities of the conductivity type opposite to that of the silicon.

The inventor proposes use of the solid diffusion technique as a method of adding impurities to the polycrystalline silicon which is most advantageous from the manufacturing viewpoint. In the case where impurities are diffused in a single crystal, the impurity concentration C at a distance X from the surface is expressed by the formula $$C=C_0 erfc\left(\frac{X}{2\sqrt{Dt}}\right) \quad (8)$$

where $C_0$ represents the surface concentration; D represents the diffusion constant, a function of the diffusion temperature; *t* represents the diffusion time; and *erfc* represents the error function. The diffusion constant D is expressed as follows:

$$D=D_0 \exp\left(\frac{-\Delta Q}{kT}\right) \quad (9)$$

where $\Delta Q$ represents the activation energy in *e*V; *k* the Boltzmann constant; and T the absolute temperature.

In diffusion of impurities into a polycrystalline material, a phenomenon is observed that they diffuse along the grain boundaries faster than through the remaining portions or the crystal grains themselves. On this particular phenomenon some reports have already been made, for example, in the following articles:

(1) "Diffusion along Small-Angle Grain Boundaries in Silicon," by H. J. Queisser, K. Hubner, and W. Shockley, The Physical Review, vol. 123, No. 4, pages 1245–1254 (1961).

(2) "Calculation of Diffusion Penetration Curve for Surface and Grain Boundary Diffusion" by J. C. Fisher, Journal of Applied Physics, vol. 22, No. 1, pages 74 to 77 (1951).

(3) "Grain-Boundary Diffusion" by A. E. Austin and N. A. Richard, Journal of Applied Physics, vol. 32, No. 8, pages 1462–1741 (1961).

From these facts, it is noted that in some cases it is necessary to assign to the diffusion constant in Formulae 8 and 9 a value properly corrected from that for a single crystal.

From the foregoing, it is readily understandable that the p-n junction formed in the polycrystalline wafer by solid diffusion of impurities may result in an irregular layer, as shown in FIG. 11.

Referring to FIG. 11, a rectifier element can still be obtained under the condition $$Ld<t \quad (10)$$

where *t* represents the thickness of the polycrystalline wafer of the polycrystalline rectifier element and L*d* the largest extent of impurity diffusion obtained along the grain boundaries. Such excessive irregularities in impurity diffusion as illustrated in FIG. 11, obviously should better be avoided as they tend to make the production of rectifier elements practically uncontrollable.

To solve this problem, the inventor resorted to the following measure. The diffusion of impurities is predominant through the grain boundaries in case the diffusion temperature is relatively low, but it has been found that, as the diffusion temperature is raised, the diffusion through the bulk or the portions other than the grain boundaries becomes predominant. Only the diffusion temperature cannot be raised above the melting point of silicon, 1420° C. This phenomenon is illustrated in FIG. 12.

Referring next to FIG. 13, one practical example of a p-n junction will be described which is formed by diffusion in the polycrystalline wafer of impurities exhibiting a conductivity type opposite to that of the wafer. In FIG. 13, reference character $L_G$ indicates the distance from the wafer surfaces to the p-n junction as formed by diffusion through the grain boundary and reference character $L_B$ indicates the distance from the surface to the p-n junction as formed by diffusion through the bulk. Defining the ratio of $L_G$ to $L_B$, i.e., $L_G/L_B$, as a flatness function F which represents the irregularities or unevenness of the p-n junction, the value of the flatness function is influenced to a large extent by the diffusion temperature as well as by the diffusion time. In other words, in the event that diffusion is carried out at a low temperature and for a short period of time to give a considerably limited diffusion length, the effect of the boundary diffusion is dominating in the formation of the p-n junction to cause a pronounced unevenness. This effect is rapidly reduced to diminish the irregularities of the junction obtained as the diffusion temperature is raised and the diffusion time extended.

This relationship is quantitatively illustrated in FIG. 14. As observed in FIG. 14, there is a tendency that the ratio of $L_G$ to $L_B$, i.e., the flatness function F, is rapidly reduced close to a unity as the diffusion temperature exceeds 1280° C. and the diffusion time five hours. For high-frequency transistors, the diffusion length is limited to several microns because of their base width. In contrast, with silicon rectifier elements for alternating-current generators for automobile use, with which the present invention is concerned, there is no such limitation imposed upon the diffusion length as with the case of high-frequency transistors, and therefore, a diffusion length of several tens of microns can be used with success. Accordingly, a substantially flat p-n junction comparable to the one obtainable in a single crystal can be industrially formed by diffusion under completely controllable conditions by employing an appropriately elevated diffusion temperature, say, 1280° C. and an appropriately extended diffusion time, say, sixteen hours.

Reference will next be made to the chart of FIG. 15 which illustrates the relationship between the diffusion temperature and the diffusion time for different values of the flatness function F for diffusion of boron and phosphorus into silicon, these two elements having substantially the same diffusion properties. It is noted that diffusion of other impurities than the two elements approximately follows this chart in essence.

In FIG. 15, the abscissa represents the diffusion time of phosphorus and boron into silicon and the ordinate represents the diffusion temperature. A number of curves in this chart represent different values of the flatness function, $F=L_G/L_B$, which is the measure of irregularities caused by the grain boundary diffusion. The hatched area in the chart represents the range of diffusion conditions usable in the practice of the present invention.

As regards the diffusion temperature, it is generally recommendable from the view point of production to employ a temperature as high as possible and practicable since the diffusion velocity increases with the diffusion temperature. Thus, the temperature might well be raised to the vicinity of the melting point of silicon, i.e., 1420° C. Experimental investigations have revealed, however, that, at diffusion temperatures exceeding 1340° C., the silicon wafer is softened and tends to bend thereby causing trouble during successive processes in the rectifier manufacture. This makes it necessary in practice to limit the diffusion temperature within a range not exceeding 1340° C.

In order to obtain high-current rectifiers, with which the present invention is primarily concerned, it is desirable to diffuse in the top and bottom surfaces such impurities as are effective to form respective semiconductors differing in the type of conductivity. In other words, it is desirable to diffuse through one surface of the silicon base an impurity which gives a conductivity type opposite to that of the silicon base, for example, to form a p-n junction while diffusing through the other surface of the base another impurity giving the same conductivity type as the silicon base. By doing this, it will be recognized that the surface resistance of the base and hence the resistance of those areas of the rectifier element connected with electrodes can be minimized. Such so-called double diffusion method is thus effective to reduce the voltage drop and hence heat generation due to the energy loss especially in high-current applications.

FIG. 16 is a schematic cross section of a rectifier including an n-type silicon base having a specific resistance of 50 Ω cm. with impurities diffused through the top and bottom surfaces. In this figure, reference character $L_1$ indicates the thickness of the layer diffused with phosphorus and $L_2$ indicates that of the layer diffused with boron.

Assuming a practical maximum reverse voltage of 50 volts for automotive rectifiers, the thickness of the depletion layer caused by the applied reverse voltage at the p-n junction amounts to approximately 25 microns and accordingly the distance W between the two diffusion layers is required to be at least 25 microns. The thicknesses of the diffusion layers are to be selected in practice at $L_1=60\mu$ and $L_2=50\mu$. Generally, in order to obtain a rectifier in which no collision occurs between the peaks of the two diffusion layers, the following condition should be satisfied:

$$(F-1)(L_1+L_2)<W \quad (11)$$

or $$(F-1)<\frac{W}{L_1+L_2}$$

Since in practice the thicknesses $L_1=60\mu$ and $L_2=50\mu$ are preferred, $$(F-1)<\frac{25}{60+50}$$

hence $$(F-1)<0.22 \quad (12)$$

or $$F<1.22 \quad (13)$$

This is a further condition to be satisfied in practicing the present invention.

As regards the diffusion time, its maximum must be approximately 100 hours for economical industrial production.

Under these conditions, it is to be observed that the temperature and time ranges for diffusion are practically restricted to the hatched area in FIG. 15. The area can be expressed by the following numerical formula by taking linear approximation of the curve for $F\leqq1.22$.

$$T\geqq(1280-70 \log \tau)^\circ \text{ C.}$$

where T respresents the diffusion temperature in ° C. and $\tau$ represents the diffusion time in hours. Similar relationship holds good also in cases where a combination of impurities other than phosphorus and boron is used.

A practical example of the present invention will next be described.

A high purity silicon material, prepared by thermal decomposition, is subjected to a single course of zone melting at a considerably high calculated speed of 5 to 10 millimeters per minute to obtain an aligned polycrystalline rod of 20 mm. diameter. This aligned polycrystalline material can be formed by thermal decomposition of silane gas, silicon tetrachloride, silicon trichloride, silicon iodide or the like substance in the following manner. First, a high-purity silicon rod of about 60 cm. length and about 3 mm. diameter is placed in a vessel and to the both ends of the rod are secured electrodes, through which current is passed to heat the rod to approximately 1100° C. On the heated silicon rod high-purity silicon, obtained by thermal decomposition of any of the abovementioned substances, is condensed to a diameter of about 20 mm. The silicon rod is then held vertically in a quartz tube about 30 mm. in diameter and is heated at one end to melt over a length of about 8 mm. by passing a high-frequency current induced by means of a high-frequency coil arranged outside of the quartz tube. The high-frequency coil is moved along the quartz tube at a speed of 5 mm. per minute or over for the purpose of zone melting to obtain an aligned polycrystalline rod. This procedure does not necessitate any seeding of single crystals and can reduce the operation time and thus reduce the running cost of the apparatus to a substantial extent as compared with those required in the case of conventional procedures of making single crystals. The aligned polycrystalline silicon rod of the n-type obtained in this manner and having a specific resistance of 50 Ω cm. is then cut into slices about 320 microns thick, the plane of whose broad faces are substantially perpendicular to the longitudinal axis of the rod. Such slice is maintained in a furnace at 1100° C. in an atmosphere of oxygen while on the other hand phosphorus pentoxide is heated to 320° C. to produce phosphorus vapor, which is introduced into the furnace for about twenty-five minutes for the purpose of vapor depositing the phosphorus on the surfaces of the silicon slice. The silicon slice is further heated to 1280° C. for twenty hours to diffuse the phosphorus through the slice surfaces to a depth of approximately 50 microns. The slice is then lapped off 70 microns on one surface thereof and the lapped slice surface is coated with a mixture of boric anhydride, $B_2O_3$, and ethylene monoglycol. The coated slice is again maintained at 1280° C. for twenty-four hours to diffuse boron to a depth of approximately 60 microns. Then the silicon slice is lapped off approximately 25 microns on both surfaces thereof to remove vitreous surface layers.

The silicon slice thus obtained and having a thickness of 200 microns is nickel plated and then a square piece of 4 x 4 mm. is cut from the nickel-plated slice to obtain a rectifier element as shown in FIG. 17. In FIG. 17, reference character P indicates the polycrystalline silicon slice and reference characters X and Y indicate the respective layers with phosphorus and boron diffused therein. The electrical characteristics of this polycrystalline rectifier element are shown in FIG. 18, where the abscissa represents the applied voltage and the ordinate the rectifier current.

Next, one practical application of the present invention will be described with reference to FIG. 19. The polycrystalline silicon rectifier element according to the present invention is particularly useful for low-voltage high-current applications involving a reverse voltage not exceeding 150 volts and a current of not less than one ampere, and, among others, for the proper supply and battery charging system of automobiles or other vehicles.

FIG. 19 illustrates one example on which rectifier elements of the present invention are used in an electrical power supply and battery charging system for automotive use. In FIG. 19, reference numeral 101 indicates a three-phase AC generator connected with the automotive engine by a belting and reference numerals 102 and 103 indicate rectifiers each including a polycrystalline silicon rectifier element of the form described hereinbefore. As illustrated, a set of six such rectifiers are electrically connected to form a three-phase full-wave rectifier circuit. Reference character E indicates a storage battery connected to the output terminal of the rectifier circuit and reference numeral 104 indicates the load.

This circuit system, including polycrystalline silicon rectifier elements of the form described hereinbefore, can be formed at low cost despite the fact that six of such rectifier elements are incorporated, as compared with the conventional arrangement including a DC generator and relay means. In addition, the circuit system is higher in durability and reliability since it includes no sliding parts as found in the relay and the commutator of the DC generator. Moreover, with this system, there is no need of discarding a portion of the chargeable voltage range adjoining to its lower limit since no hysteresis effect as inherent to the relay is involved, and this helps to obtain a higher charging efficiency. It will be apparent from the foregoing that the rectifier device according to the present invention is highly useful for the power supply and battery charging system for automotive use.

What is claimed is:

1. A method of manufacturing semiconductor devices comprising the steps of growing an aligned polycrystalline rod in a predetermined direction from a melt of high purity silicon having an impurity concentration of not more than 1 percent per million, the direction of said alignment being in a direction substantially parallel with said direction of growth cutting said silicon rod in slices with each slice being in a direction substantially perpendicular to said direction of growth of said rod, forming a p-n junction within said slice by diffusing through one surface thereof at least one kind of impurity exhibiting a conductivity of the type opposite to that of the polycrystalline rod material, said junction being substantially perpendicular to said direction of growth of said aligned polycrystalline rod.

2. A method of manufacturing semiconductor devices as claimed in claim 1 further comprising the step of diffusing through the other surface of said slice at least one kind of impurity, having the same conducitvity type as said polycrystalline rod material.

3. A method of manufacturing semiconductor devices as claimed in claim 1 in which said polycrystal is of n type and the impurity is boron the diffusion of which is effected in the following range of temperature:

$$T \geqq (1280-70 \log \tau)$$

where T represents the temperature in °C. and $\tau$ represents the time of diffusion in hours.

4. A method of manufacturing semiconductor devices as claimed in claim 1 in which said polycrystal is of p type and the impurity is phosphorus the diffusion of which is effected in the following range of temperature:

$$T \geqq (1280-70 \log \tau)$$

where T represents the temperature in °C. and $\tau$ represents the time of diffusion in hours.

5. A method of manufacturing semiconductor devices as claimed in claim 2 in which boron is diffused through one surface of said slice and phosphorus is diffused through an opposite surface of said slice, the diffusion of said impurities being effected in the following range of temperatures:

$$T \geqq (1280-70 \log \tau)$$

where T represents the temperature in °C. and $\tau$ represents the time of diffusion in hours.

6. A method of manufacturing semiconductor devices as claimed in claim 1 in which the diffusion of impurities is effected at a temperature not higher than 1340° C.

7. A method of manufacturing semiconductor devices as claimed in claim 1 in which the time of diffusion does not exceed 100 hours.

References Cited

UNITED STATES PATENTS

| | | | |
|---|---|---|---|
| 3,013,192 | 12/1961 | Starr ---------- | 148—174 XR |
| 3,126,505 | 3/1964 | Shockley ------ | 148—33.2 XR |
| 3,162,507 | 12/1964 | Dermatis -------- | 148—1.6 XR |

HYLAND BIZOT, *Primary Examiner.*